United States Patent [19]

Briesch

[11] Patent Number: 5,640,840
[45] Date of Patent: Jun. 24, 1997

[54] RECUPERATIVE STEAM COOLED GAS TURBINE METHOD AND APPARATUS

[75] Inventor: Michael S. Briesch, Orlando, Fla.

[73] Assignee: Westinghouse Electric Corporation, Pittsburgh, Pa.

[21] Appl. No.: 354,388

[22] Filed: Dec. 12, 1994

[51] Int. Cl.$^6$ .................................................. F02C 3/30
[52] U.S. Cl. ........................................ 60/39.05; 60/39.55
[58] Field of Search ............................... 60/39.05, 39.53, 60/39.55, 39.58, 39.59; 415/114

[56] References Cited

FOREIGN PATENT DOCUMENTS

| 0543627 | 5/1993 | European Pat. Off. |
| 2236145 | 3/1991 | United Kingdom . |

OTHER PUBLICATIONS

Patent Abstracts of Japan, vol. 016, No. 434 (M–1308), Sep. 10, 1992.
Patent Abstracts of Japan, vol. 011, No. 263 (M–619), Aug. 26, 1987.

Primary Examiner—Louis J. Casaregola
Attorney, Agent, or Firm—M. G. Panian

[57] ABSTRACT

A recuperative steam cooled gas turbine in which steam used to cool the turbine section is subsequently introduced into the combustors, thereby recuperating the heat absorbed by the steam during cooling. The steam is generated in a heat recovery steam generator and then directed to a manifold within the turbine shell. From the manifold, the steam flows through passages formed within the interior of the vane by a baffle, thereby cooling the vane and heating the steam. The steam is then discharged from the vane into a chamber that collects the compressed air from the compressor. In the chamber, the heated steam mixes with the compressed air and the air/steam mixture then flows into the combustors, where it serves to reduce NOx generation from the combustors and increase power output from the turbine.

14 Claims, 3 Drawing Sheets

RECUPERATIVE STEAM COOLED GAS TURBINE METHOD AND APPARATUS

BACKGROUND OF THE INVENTION

The present invention relates to a cooling system for a gas turbine. More specifically, the present invention relates to a recuperative cooling system in which steam used to cool the turbine section is subsequently directed to the combustor for NOx control and power augmentation.

A gas turbine is comprised of a compressor section that produces compressed air that is subsequently heated by burning fuel in a combustion section. The hot gas from the combustion section is directed to a turbine section where the hot gas is used to drive a rotor shaft to produce power. The combustion section is typically comprised of a shell that forms a chamber that receives compressed air from the compressor section. A plurality of cylindrical combustors are disposed in the chamber and receive the compressed air along with the fuel to be burned. A duct is connected to the aft end of each combustor and serves to direct the hot gas from the combustor to the turbine section.

Unfortunately, the combustion process occurring within the combustors results in the generation of nitrogen oxides ("NOx") in the hot gas. Since NOx is considered an atmospheric pollutant, numerous method have been tried to reduce NOx generation. According to one method, steam is introduced into the combustor to rapidly quench the combustion process to a temperature below that which promotes high NOx generation rates. In such instances, steam is injected either directly into the combustor or into the chamber in which the combustors are located. The gas/steam mixture produced as a result of the injection then flows through the turbine. Thus, in addition to reducing NOx, the injection of steam increases the mass flow of the working fluid expanded in the turbine and, therefore, the turbine power output. However, additional fuel must be burned in the combustor to raise the temperature of the steam to the desired temperature for the hot gas entering the turbine, which is typically in excess of 1100° C. (2000° F.) and may be as high as 1425° C. (2600° F.) or higher.

Another problem associated with gas turbines is the cooling of the turbine components. The turbine section of a gas turbine typically employs a plurality of stationary vanes circumferentially arranged in rows. Since such vanes are exposed to the hot gas discharging from the combustion section, cooling of these vanes is of utmost importance. Traditionally, cooling was accomplished by using compressed air bled from the chamber in which the combustors are located as cooling air. The cooling air was directed through a cavity formed in the airfoil portion of the vane, which is essentially hollow. Typically, a number of small cooling air passages are formed inside the vane airfoil that extend from the cavity to the surfaces of the vane, such as the leading and trailing edges or the suction and pressure surfaces. Often, such as in the case of leading edge cooling, the passages direct the cooling air from the cavity so that it flows over the surface of the vane in a thin film, thereby cooling the vane in what is often referred to as "film cooling." In any case, after the cooling air exits the vane passages, it enters and mixes with the hot gas flowing through the turbine section.

Unfortunately, the traditional approach to cooling the turbine vanes has a detrimental impact on the thermal efficiency of the gas turbine. Although the cooling air eventually mixes with the hot gas expanding in the turbine, since it bypasses the combustion process the work recovered from the expansion of the compressed cooling air is much less than that recovered from the expansion of the compressed air heated in the combustors. In fact, as a result of losses due to pressure drop and mechanical efficiency, the work recovered from the cooling air is less than that required to compress the air in the compressor. In addition, discharging the cooling air into the hot gas flow results in aerodynamic losses as the cooling air mixes with the hot gas.

One approach suggested in the past has been to avoid bleeding compressed air by using steam generated from exhaust heat to cool the turbine components. After flowing through the vanes, the steam is typically discharged into the hot gas flowing through the turbine, as in the case where compressed air is used as the cooling fluid. Unfortunately, this approach does not result in the optimum recovery of the heat absorbed by the steam in cooling the turbine components.

Therefore, it would be desirable to provide an apparatus and method for cooling the stationary vanes in a gas turbine that did not require bleeding air from the compressor and that made optimum use of steam for purposes of NOx control and power augmentation.

SUMMARY OF THE INVENTION

Accordingly, it is the general object of the current invention to provide an apparatus and method for cooling the stationary vanes in a gas turbine that did not require bleeding air from the compressor and that made optimum use of steam for purposes of NOx control and power augmentation.

Briefly, this object, as well as other objects of the current invention, is accomplished in a gas turbine power plant, comprising a combustor having means for producing a hot compressed gas by burning a fuel therein, and a turbine for expanding the hot compressed gas so as to produce an expanded gas and shaft power. According to the invention, the turbine has (i) a plurality of airfoils for directing the flow of the hot compressed gas through the turbine, (ii) means for directing a flow of steam through the airfoils, wherein heat is transferred from the airfoils to the steam, thereby cooling the airfoils and heating the steam, and (iii) means for directing the heated steam from the airfoils to the combustor, whereby the heated steam is further heated in the combustor and forms a portion of the hot gas produced by the combustor and expanded in the turbine.

The present invention also encompasses a method for use in a gas turbine power plant having a combustor for producing a hot compressed NOx bearing gas and a turbine for expanding the hot compressed gas so as to produce shaft power, the turbine has a plurality of airfoils disposed therein. The method provides for increasing the shaft power output of the turbine, reducing NOx concentration in the hot compressed gas, and cooling the airfoils, and comprises the steps of (i) generating a flow of steam, (ii) directing at least a portion of the flow of steam to the airfoils and flowing the steam therethrough, thereby cooling the airfoils and heating the steam, (iii) directing the flow of heated steam from the airfoils to the combustor for mixing therein with the hot compressed NOx bearing gas, thereby quenching the gas and reducing NOx concentration in the gas and producing a hot gas/steam mixture, (iv) flowing the hot gas/steam mixture through the turbine so as to produce shaft power therein, whereby the hot gas/steam mixture flows over the airfoils, thereby transferring heat thereto for heating the steam.

DESCRIPTION OF THE PREFERRED EMBODIMENT

Figure 1:
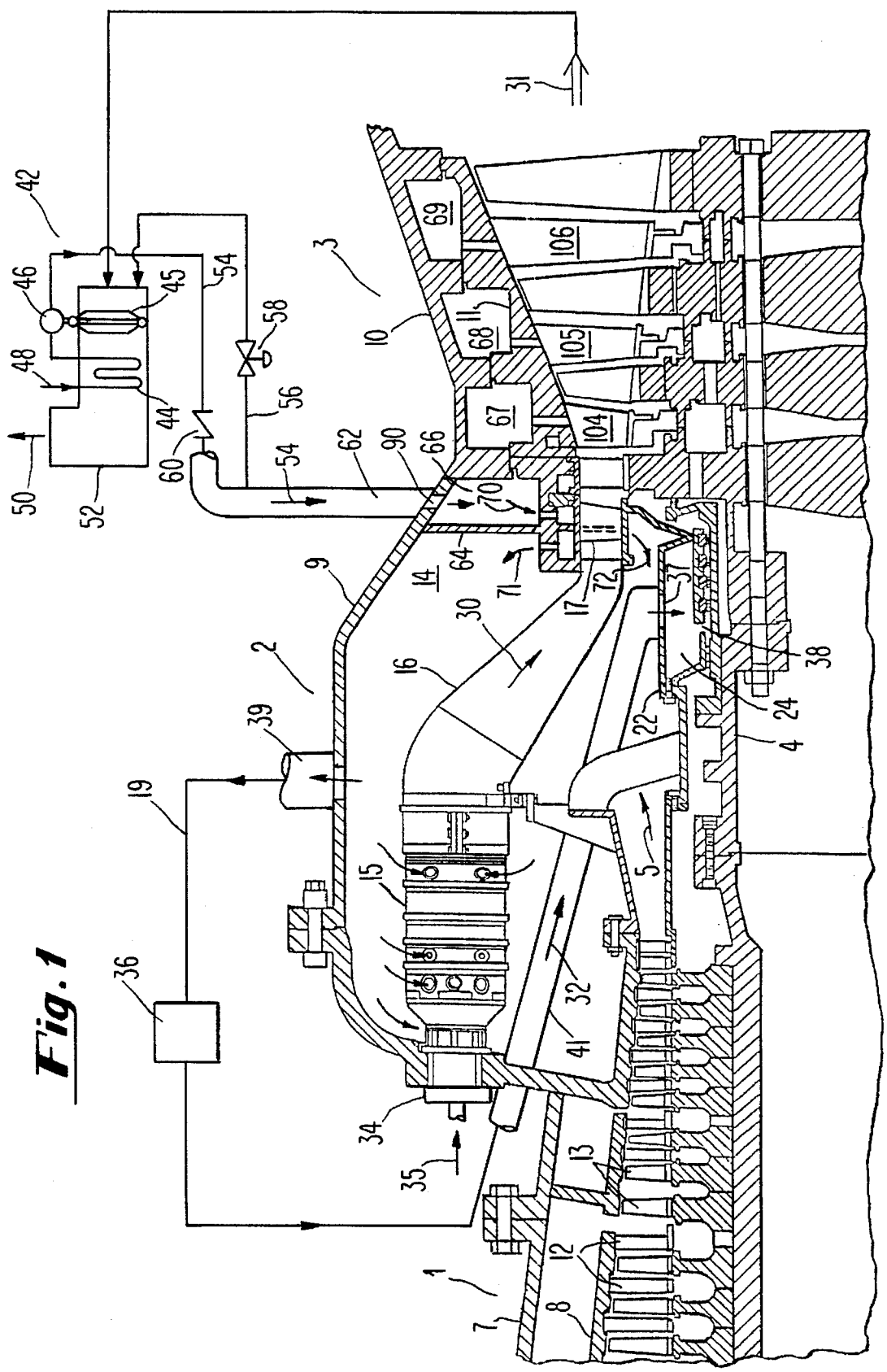
FIG. 1 is a longitudinal cross-section, partially schematic, of a gas turbine power plant according to the current invention.

Referring to the drawings, there is shown in FIG. 1 a longitudinal cross-section through a portion of a gas turbine in a gas turbine power plant. The major components of the gas turbine are a compressor section 1, a combustion section 2, and a turbine section 3. As can be seen, a rotor 4 is centrally disposed and extends through the three sections. The compressor section 1 is comprised of cylinders 7 and 8 that enclose alternating rows of stationary vanes 12 and rotating blades 13. The stationary vanes 12 are affixed to the cylinder 8 and the rotating blades 13 are affixed to discs attached to the rotor 4.

The combustion section 2 is comprised of an approximately cylindrical shell 9 that forms a chamber 14, together with the aft end of the cylinder 8 and a housing 22 that encircles a portion of the rotor 4. A plurality of combustors 15 and ducts 16 are contained within the chamber 14. The ducts 16 connect the combustors 15 to the turbine section 3. Fuel 35, which may be in liquid or gaseous form —such as distillate oil or natural gas—enters each combustor 15 through a fuel nozzle 34 and is burned therein so as to form a hot compressed gas 30. As a result of the combustion process, the hot gas 30 contains oxides of nitrogen ("NOx"), which is considered an atmospheric pollutant.

The turbine section 3 is comprised of an outer cylinder 10 that encloses an inner cylinder 11. The inner cylinder 11 encloses rows of stationary vanes 17, 104–106 and rows of rotating blades that serve to direct the flow of the hot gas 30 through the turbine. The stationary vanes are affixed to the inner cylinder 11 and the rotating blades are affixed to discs that form a portion of the turbine section of the rotor 4.

In operation, the compressor section 1 inducts ambient air and compresses it. The compressed air 5 from the compressor section 1 enters the chamber 14 and is then distributed to each of the combustors 15 via holes formed therein. According to the current invention, steam flows 71 and 72 that have been used to cool the stationary vanes in the turbine 3, as discussed below, are mixed into the compressed air 5 in the chamber 14. From the chamber 14, the mixture of steam and compressed air enters the combustors 15. In the combustors 15, the fuel 35 is mixed into the compressed air/steam mixture and burned, thereby forming the hot compressed gas 30, which includes the steam 71 and 72. As is well known in the art, the presence of the steam serves to reduce the amount of NOx in the hot gas 30 discharged from the combustors 15.

From the combustors 15, the hot compressed gas 30 flows through the ducts 16 and then through the rows of stationary vanes and rotating blades in the turbine section 3, wherein the gas expands and generates shaft power that drives the rotor 4. As a result of the increased mass flow of the gas 30 due to the introduction of steam into the compressed air 5, the shaft power produced by the turbine 3 is increased. The expanded gas 31 is then exhausted from the turbine 3. Although its temperature has been reduced in flowing through the turbine 3, the expanded gas 31 is still relatively hot—typically at least 480°–540° C. (900°–1000° F.). According to a preferred embodiment of the current invention, the expanded gas 31 is directed to a HRSG 42, as discussed further below.

Although a major portion of the compressed air/steam mixture in the chamber 14 enters the combustors 15, a portion 19 is extracted from the chamber 14 by means of a pipe 39 connected to the shell 9, thereby bypassing the combustors 15 and forming the coolant for the rotating turbine blades and other components of the rotor 4. If desired, the coolant 19 may be cooled by an external cooler 36. From the cooler 36, the coolant 32 is then directed to the turbine section 3 by means of a pipe 41. The pipe 41 directs the coolant 32 to openings 33 formed in the housing 22, thereby allowing it to enter a manifold 24 that encircles the rotor 4. The coolant 32 exits the manifold 24 through passages 43 and then travels through a series of passages within the rotor 4 to the various rows of rotating blades.

The current invention is discussed with reference to the cooling of the stationary vanes in the turbine 3. In the embodiment shown in FIG. 1, the second, third and fourth rows of stationary vanes 104–106, respectively, are cooled in the traditional manner. The inner cylinder 11 and the outer cylinder 10 form manifolds 67–69 between themselves. Pipes (not shown) supply cooling air bled from the compressor 2 to the manifolds 67–69, which then distribute the cooling air to the second, third and fourth rows of stationary vanes 104–106, respectively. From the vanes 104–106, the cooling air is discharged into the hot gas flowing through the turbine 3.

The current invention is illustrated in FIG. 1 with respect to the first row of stationary vanes 17, the cooling of which is discussed in detail below.

As shown in FIG. 1, the gas turbine power plant also includes a heat recovery steam generator ("HRSG") 42. The HRSG 42 includes an evaporator 45, a steam drum 46, and an economizer 44. As is conventional, the evaporator 45 and the economizer 44 may have heat transfer surfaces comprised of finned tubes through which feed water, from a feed water supply 48, and steam flow.

The expanded gas 31 from the turbine 3 is directed to the HRSG 42, where it flows over the heat transfer surfaces of the evaporator 45 and economizer 44. In so doing, heat from the gas 31 is transferred to feed water 48, thereby generating steam 54 that is extracted from the steam drum 46. If desired, a superheater could also be incorporated into the HRSG 42 to increase the temperature of the steam. However, according to the current invention, heat transferred from the turbine vanes is used to superheat the steam 54. From the HRSG 42, the cooled and expanded gas 50 is exhausted to atmosphere via a stack 52.

Figure 2:
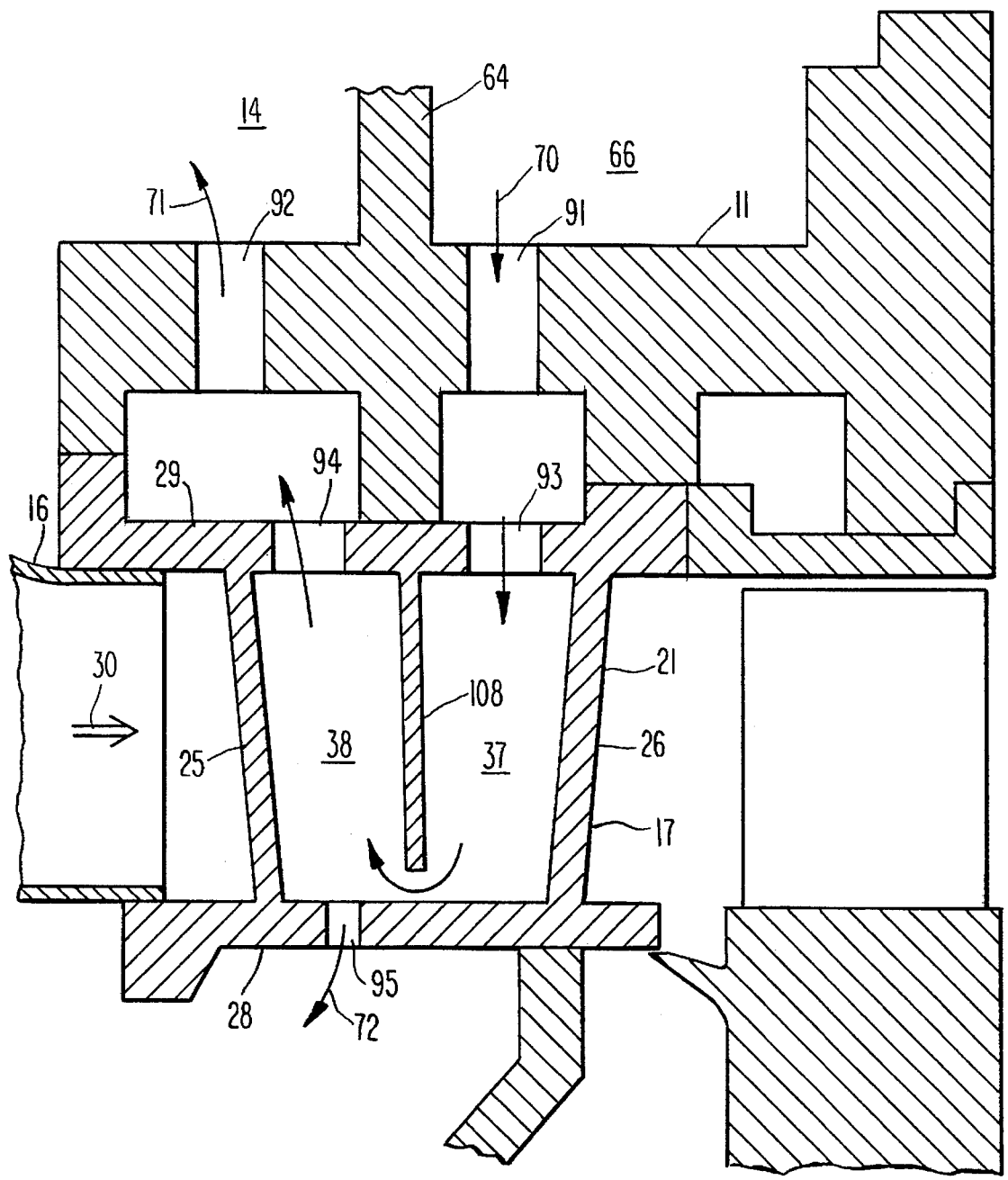
FIG. 2 is a detailed view of the gas turbine shown in FIG. 1 in the vicinity of the first stage vanes.

As shown in FIG. 1, the steam 54 from the HRSG 42 is directed by a supply pipe 62 to a hole 90 in the outer cylinder 10 and then to a manifold 66 formed between the shell 9 and the inner cylinder 11. A wall 64 extending between the shell 9 and the cylinder 11 prevents the steam 54 from entering the chamber 14 directly. As shown in FIG. 2, a plurality of holes 91 in the inner cylinder 11 direct streams of steam 70 from the manifold 66 to each of the first row vanes 17.

The vanes 17 are comprised of an inner shroud 28, an outer shroud 29 and an airfoil portion 21 extending between the two shrouds. The airfoil 21 has a leading edge 25 and a trailing edge 26 and is substantially hollow. Within the interior of each vane 17, a baffle 108 extends radially inward from the outer shroud 29 part of the distance to the inner shroud 28, thereby dividing the airfoil interior into two passages 37 and 38.

The steam 70 enters the vanes 17 through inlet holes 93 formed in the outer shrouds 29. In the preferred embodiment of the invention, all of the steam 70 that enters the hole 93 flows radially inward through the passage 37. However, a portion 72 of the steam 70 is discharged through an outlet hole 95 in the inner shroud 28 after it has flowed through passage 37. The remainder 71 of the steam turns 180° and flows radially outward through passage 38. From the passage 38, the steam 71 discharges through outlet hole 94 in the outer shroud 29. From the hole 94 the steam 71 exits through a hole 92 in the inner cylinder 11.

From the holes 92 and 95, the steam 71 and 72 enters the chamber 14, where it mixes with the compressed air 5 from the compressor 1, as previously discussed. As a result of having flowed through the passages 37 and 38, heat is transferred from airfoil 21 to the steam 70, thereby cooling the airfoil and heating the steam. According to the current invention, the steam cooling of the vanes 17 is recuperative in that the heated steam 71 and 72 from the vanes is subsequently directed to the combustor 15 so that the heat absorbed by the steam in cooling the vanes 17 is recovered—that is, the increase in the temperature of the steam as a result of cooling the vanes 17 reduces the amount of fuel 35 that must be burned in the combustors 15 in order to obtain the desired temperature for the gas 30 entering the turbine 3. Such recuperation increases the thermal efficiency of the gas turbine power plant.

Steam is a more effective coolant than compressed air. Therefore, in the preferred embodiment, the vanes 17 are cooled by bulk convective cooling, without the film cooling traditionally employed when compressed air is used as the cooling fluid. Consequently, in the preferred embodiment, no steam bypasses the combustors 15 by being discharged directly from the vanes 17 into the hot gas 30 flowing through the turbine 3. Rather, all of the steam 54 is directed to the chamber 14. However, if desired, a portion of the steam 54 could be discharged from the airfoils 21 directly into the hot gas 30 using traditional film cooling techniques.

Even when steam film cooling is used in practicing the current invention, a major portion of the steam 54 can be returned to the chamber 14 for use in the combustors 15. This is in contrast to traditional air cooling techniques, in which all of the air used to cool the vanes is discharged directly into the hot gas 30 flowing through the turbine 3 without recuperating the heat absorbed by the cooling air in the combustors 15. This is so because even if the cooling air is initially bled from the chamber 14 (which is the highest pressure air source available) the pressure of the cooling air will be lower than that of the pressure of the compressed air 5 in the chamber 14 by the time the cooling air reaches the vanes 17, due to the pressure drop in the cooling air circuit. Thus, using traditional methods, compressed air used to cool the vanes can be recuperated by recirculation back to the combustors 15 only by use of a boost air compressor. However, the power consumption by such a boost compressor would reduce the net power output of the plant.

By contrast, according to the current invention, the HRSG 12 produces steam 54 at a pressure well above that of the compressed air 5 in the chamber 14. The pressure of the compressed air 5 will depend on the firing temperature of the gas turbine but will typically be in the range of 700 to 2100 kPa (100 to 300 psi). Thus, the steam 54 supplied to the turbine 3 should typically be in excess of 2100 kPa (300 psi) so that there is an adequate pressure differential to force the steam through the steam cooling passages in the vanes 17 and into the chamber 14.

Since heat from the expanded gas 31 discharged by the turbine 3 is used to generate the steam 54, sufficiently high pressure steam to cool the vanes 17 will not be initially available during start-up of the gas turbine. While a supplemental source of steam could be used during start-up, in the preferred embodiment of the invention, a portion of the compressed air 5 from the chamber 14 is used for vane cooling during start-up. This supplemental cooling is facilitated by a bypass line 56 that extends from the steam pipe 62 to the gas inlet of the HRSG 42, as shown in FIG. 1.

At start-up, a flow control valve 58 in the bypass line 56 is opened, thereby allowing compressed air 5 from the chamber 14 to flow through the passages 38 and 37 in the reverse direction from that of the steam flow 70 during steady state operation—that is, the chamber 14 directs a first portion of the compressed air to hole 92, which directs it to outlet hole 94 in the outer shroud. From hole 94, the air flows radially inward through passage 38. The chamber 14 also directs a second portion of the compressed air to the outlet hole 95 in the inner shroud 28, from which it then flows radially outward through passage 37 along with the first portion of compressed air. During start-up, the balance of the compressed air 5 produced by the compressor 1 that is not directed to the vanes 17 either enters the combustors 15 or is extracted by the pipe 39 for rotor cooling, as occurs during steady state operation.

After flowing through passage 37, the supplemental cooling air exits the vanes 17 through holes 93 in the outer shrouds 29. It then discharges through the holes 91 in the inner cylinder 11 and then through hole 90 in the shell 9. Thus, at start-up, the supplemental cooling air flows through the same flow path as the steam 70 does during steady state operation but does so in the opposite direction from that taken by the steam. After exiting the turbine 3, the supplemental cooling air is directed by the supply pipe 62 and the bypass pipe 56 to the HRSG 42, from which it is vented to atmosphere. A check valve 60 installed in the pipe 62 ensures that compressed air 5 will not be directed to the steam drum 46.

As the gas turbine is brought to steady state operation, the mass flow and temperature of the expanded gas 31 flowing through the HRSG 42 will increase, thereby increasing the steam generation capacity of the HRSG. As the pressure of the steam in the steam drum 46 increases, the check valve 60 will eventually open, thereby causing steam to mix with the air flowing through the bypass pipe 56. When sufficient steam pressure is generated in the steam drum 46 to overcome the pressure of the compressed air 5 in the chamber 14, the flow control valve 58 is closed so that the steam 54 is directed into the pipe 62 for use in cooling the turbine vanes 17, as before.

Figure 3:
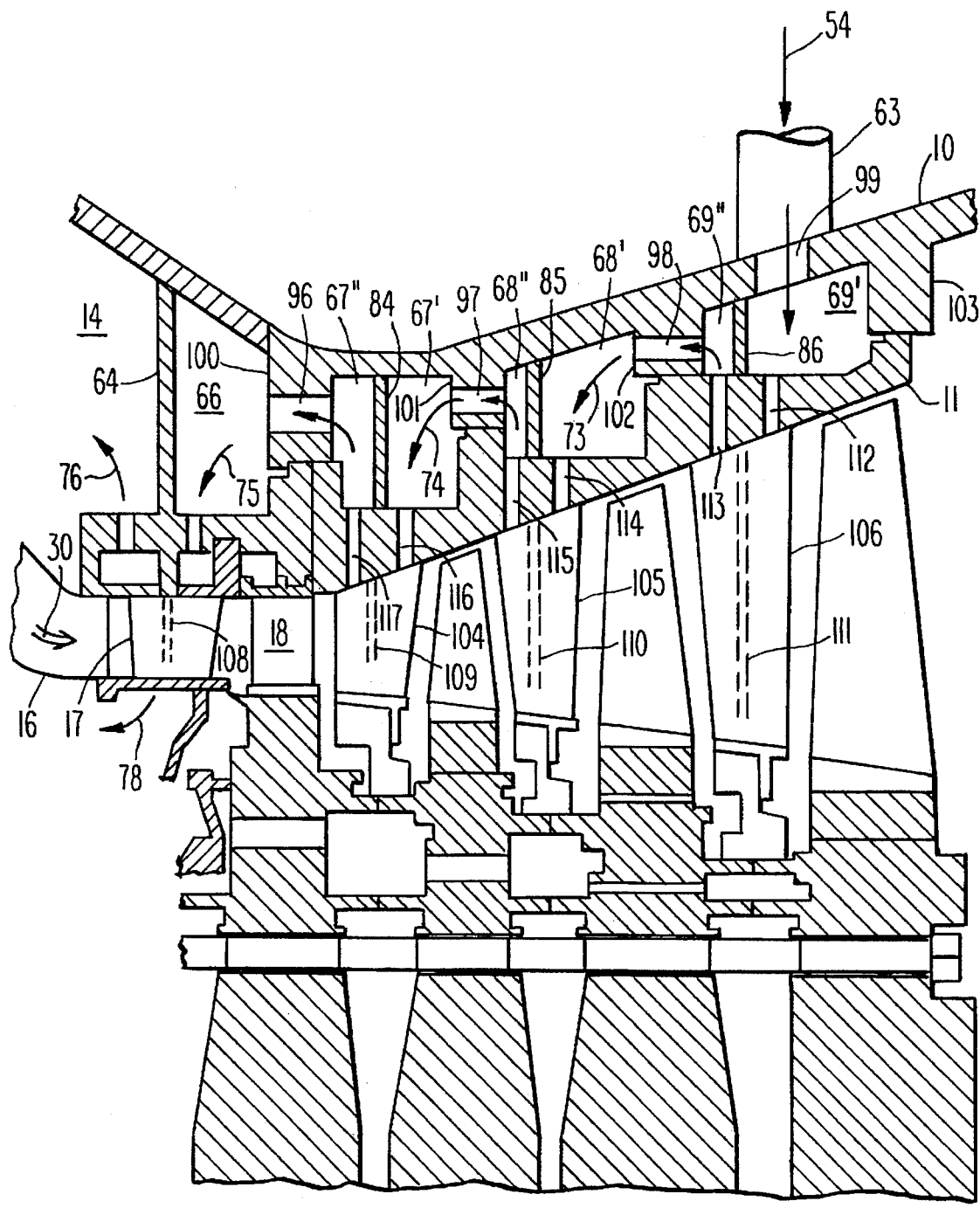
FIG. 3 is a view of the turbine section of a gas turbine incorporating another embodiment of the current invention.

FIG. 3 shows another embodiment of the invention, in which the steam 54 is used to cool all four rows of stationary vanes. In this embodiment, baffles 84–86 divide each of the manifolds 67–69 into inlet and outlet manifolds, with the inlet manifold being designated by prime and the outlet manifold by a double prime in FIG. 3. Baffles 109–111 formed in the second, third and fourth row vanes 104–106, respectively, divide the interiors of each of these vanes into first and second passages, as in the case of the first row vanes 17.

A steam pipe 63 and a hole 99 in the outer cylinder 10 directs the steam 54 from the HRSG 42 to the inlet manifold 69' for the fourth row vanes 106. From the inlet manifold 69', the steam 54 flows through holes 112 in the inner cylinder 11 and then into the vanes 106 of the fourth row of stationary vanes. After flowing through the passages in the fourth row vanes 106, the steam discharges through holes 113 in the inner cylinder 11 into the outlet manifold 69". Holes 98 in the wall 102 separating the manifolds 68 and 69 then direct the steam to the inlet manifold 68' for the third row vanes 105. From the inlet manifold 68', the steam flows through holes 11 in the inner cylinder into the third row of stationary vanes 105. After flowing through the passages in the third row vanes 105, the steam discharges through holes 115 in the inner cylinder 11 into the outlet manifold 68". Holes 97 in the wall 101 separating the manifolds 67 and 68 then direct the steam to the inlet manifold 67' for the second row vanes 104. From the inlet manifold 67', the steam 54 flows through holes 116 in the inner cylinder into the second row of stationary vanes 104. After flowing through the passages in the second row vanes 104, the steam discharges through holes 117 in the inner cylinder 11 into the outlet manifold 67". Holes 96 in the wall 100 separating the manifolds 66 and 67 then direct the steam to the inlet manifold 66 for the first row vanes 17. From the manifold 66, the steam 54 flows through the first row vanes 17 and then exits as steam flows 76 and 78 into the chamber 14 for recuperation in the combustors 15, as discussed with respect to the embodiment shown in FIG. 1.

Thus, according to the second embodiment, the steam 54 flows through each of the rows of stationary turbine vanes sequentially in a cascade manner, thereby cooling all of the turbine vanes without the need to bleed off compressed air. Due to the pressure drop in the steam cooling circuit discussed above, in the embodiment shown in FIG. 3, the HRSG 42 must produce steam 54 at a pressure considerably higher than the pressure of the compressed air 5 in the chamber 14. This will ensure that an adequate pressure differential exists between the steam and the compressed air 5 by the time the steam reaches the first row vanes 17 to cause the steam to flow through the vanes at a sufficiently high rate for proper cooling.

Although the present invention has been discussed with reference to the cooling of the stationary vanes in a gas turbine, the invention could also be adapted for use in cooling the rotating blades or turbine rotor. Thus, the present invention may be embodied in other specific forms without departing from the spirit or essential attributes thereof and, accordingly, reference should be made to the appended claims, rather than to the foregoing specification, as indicating the scope of the invention.

I claim:

1. A gas turbine power plant, comprising:
  a) a compressor for producing of flow of compressed air;
  b) means for directing at least a first portion of said flow of said compressed to a combustor having means for producing a hot compressed gas by burning a fuel in said first portion of said flow of compressed air therein;
  c) a turbine for expanding said hot compressed gas from said combustor so as to produce an expanded gas and shaft power, said turbine having a plurality of airfoils for directing the flow of said hot compressed gas through said turbine;
  d) means for directing a flow of steam in a first direction through said airfoils, wherein heat is transferred from said airfoils to said steam, thereby cooling said airfoils and heating said steam;
  e) means for directing said heated steam from said airfoils to said combustor, whereby said heated steam is further heated in said combustor and forms a portion of said hot compressed gas produced by said combustor; and
  f) means for directing a second portion of said flow of compressed air in a second direction through said airfoils only when said flow of steam does not flow through said airfoils.

2. The gas turbine power plant according to claim 1, further comprising means for generating said flow of steam.

3. The gas turbine power plant according to claim 2, wherein said means for generating said flow of steam comprises means for transferring heat from said expanded gas produced by said turbine to a flow of feed water.

4. The gas turbine power plant according to claim 2, wherein said means for generating said flow of steam comprises a heat recovery steam generator.

5. The gas turbine power plant according to claim 1, wherein:
  a) each of said airfoils has a steam passage formed therein, each of said steam passages having a steam inlet and a steam outlet; and
  b) said means for directing said flow of steam through said airfoils has means for directing said flow of steam to said airfoil steam passage inlet.

6. The gas turbine power plant according to claim 5, further comprising:
  a) means for directing said second portion of said flow of compressed air produced by said compressor to said airfoil steam passage outlet for flow therethrough to said airfoil steam passage inlet.

7. The gas turbine power plant according to claim 1, wherein said second direction is opposite to said first direction.

8. The gas turbine power plant according to claim 1, wherein said plurality of airfoils comprises a plurality of vanes for directing the flow of said hot compressed gas through said turbine, each of said vanes having a cooling passage formed therein.

9. The gas turbine power plant according to claim 8, wherein:
  a) said vanes form first and second rows of vanes; and
  b) said means for directing a flow of steam through said vane cooling passages comprises means for directing said flow of steam sequentially through said second row of vanes and then said first row of vanes.

10. The gas turbine power plant according to claim 9, wherein said second row of vanes is disposed downstream from said first row of vanes with respect to the flow of said hot compressed gas through said turbine.

11. The gas turbine power plant according to claim 8, further comprising a shell, said combustor disposed in said shell, and wherein each of said vanes comprises an airfoil portion and a shroud portion, each of said shrouds having an opening in flow communication with said shell and with said cooling passage.

12. The gas turbine power plant according to claim 8, wherein said means for directing said flow of steam through said vane cooling passages comprises means for directing said flow of steam through said cooling passages in a first direction, and further comprising means for directing a flow of compressed air through said vane cooling passages in a second direction opposite to said first direction when said flow of steam is not flowing through said cooling passages.

13. In a gas turbine power plant having a compressor for producing compressed air and a combustor for burning a fuel in said compressed air to produce a hot compressed $NO_x$ bearing gas and a turbine for expanding said hot compressed gas so as to produce shaft power, said turbine having a plurality of airfoils disposed therein, a method of (i) increasing said shaft power output produced by said turbine, (ii) reducing $NO_x$ concentration in said hot compressed gas, and (iii) cooling said airfoils, comprising the steps of:
  a) generating a flow of steam;

b) directing at least a portion of said flow of steam to said airfoils and flowing said steam therethrough in a first direction, thereby cooling said airfoils and heating said steam;

c) directing a portion of said compressed air through said airfoils in a second direction;

d) directing said flow of heated steam from said airfoils to said combustor for mixing therein with said hot compressed $NO_x$ bearing gas, thereby quenching said gas and reducing $NO_x$ concentration in said gas and producing a hot gas/steam mixture; and e) flowing said hot gas/steam mixture through said turbine so as to produce shaft power therein, whereby said hot gas/steam mixture flows over said airfoils, thereby transferring heat thereto for heating said steam, the second direction being opposite from the first direction.

14. The gas turbine power plant according to claim 2, wherein said means for flowing said second portion of said compressed air in a second direction through said airfoil only when said flow of steam does not flow through said airfoil comprises:

a) a conduit for directing said steam from said means for generating said flow of steam to said airfoil;

b) a first valve operably associated with conduit for admitting steam from steam generating means to said conduit;

c) a second valve operably associated with said conduit for exhausting said second flow of compressed air from said airfoil, wherein said first and second valves are alternately opened and closed depending on whether steam or compressed air is flowing through said airfoil.

* * * * *